No. 876,271. PATENTED JAN. 7, 1908.
H. LE B. GRAY.
PHOTOGRAPHIC FILM CARTRIDGE.
APPLICATION FILED NOV. 3, 1905.
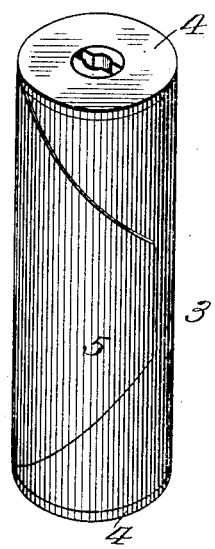
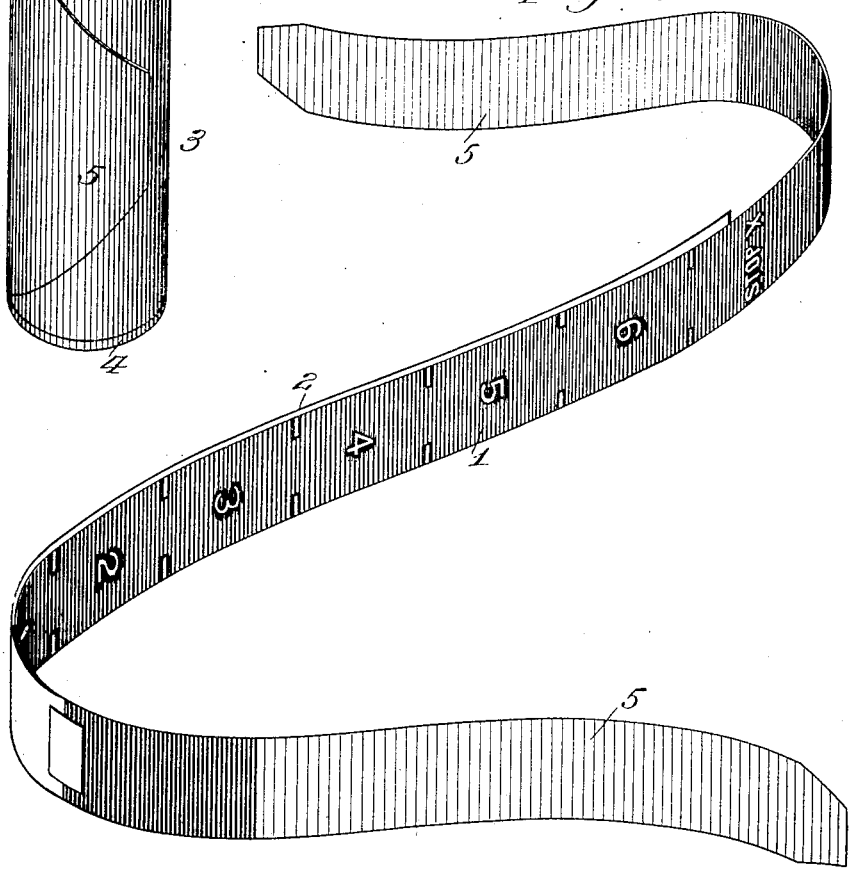

UNITED STATES PATENT OFFICE.

HARRY LE B. GRAY, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM CARTRIDGE.

No. 876,271. Specification of Letters Patent. Patented Jan. 7, 1908.

Original application filed March 20, 1905, Serial No. 250,948. Divided and this application filed November 3, 1905. Serial No. 285,671.

*To all whom it may concern:*

Be it known that I, HARRY LE B. GRAY, of Rochester, in the county of Monroe and State of New York, have invented certain new and useful Improvements in Photographic-Film Cartridges; and I do hereby declare the following to be a full, clear, and exact description of the same, reference being had to the accompanying drawings, forming a part of the specification, and to the reference-numerals marked thereon.

My present invention relates to photographic film rolls or cartridges of a type such as that described in my prior application filed March 20, 1905, Serial No. 250,948, and entitled "Improvements in photographic film cartridges" of which the present application is a division, such cartridges embodying generally a strip of sensitized photographic film attached at one end to a strip of opaque material, such as black paper, to protect it from exposure to light or other deteriorating agents and wound with it upon a flanged spool, and my invention has for its further object to render this strip particularly impervious to moisture and thus protect the film while rolled from the changes of atmospheric condition.

To these and other ends the invention consists in certain improvements and combinations of parts all as will be hereinafter more fully described, the novel features being pointed out in the claims at the end of the specification.

In the drawings: Figure 1 is a perspective view of a film cartridge embodying my invention, when rolled. Fig. 2 is a perspective view of the film and backing when unrolled.

Similar reference numerals in the several figures indicate similar parts.

In the embodiment shown 1 indicates the covering or protecting strip of the usual or any preferred type having the usual characters upon its outer surface for positioning the film and marking the exposures and 2 indicates the film embodying generally a nitro-cellulose base having a coating of gelatino argentic emulsion and shorter than the covering strip, arranged intermediate the ends of the latter and attached thereto at one end only so as to be moved by and with it through the holder.

3 indicates the spool having the flanges 4 at the ends.

As a further protection for the film, and for the purpose of preventing it from being acted upon by moisture, in the form of vapor and also to prevent liquid from soaking through from the outer convolutions, I coat the ends of the outer paper covering before being wound, with paraffin, or similar waterproof material, as indicated at 5, one of these coated ends being next the spool, and the other forming several convolutions on the outer side, so that when the film is wound on a spool or roller from either end it will be effectually covered by several convolutions of moisture-proof material. The edges of this coated portion abutting the flanges of the spool may serve as a sort of a seal to protect the film from the injurious action of moisture, which seal differs from a separate covering of such material as tin foil, which has been heretofore used, in that the sealing material is connected with or forms a part of the covering and is removed in the operation of using the cartridge in the camera or roll holder. This feature of rendering moistureproof the ends of strips of covering material which are connected to the film and serving to cover the convolutions of film when either end is next the spool, is not confined in its application to the specific form of cartridge shown wherein the covering strip is parallel with the film throughout its entire length, but may be employed on any form of cartridge wherein the film is covered by flexible strips wrapped around the outer convolutions thereof when the film is wound from one support to another, though I much prefer to employ the form shown.

I claim as my invention:

1. A photographic film cartridge composed of a strip of flexible sensitized film and an opaque flexible covering strip or backing longer than the film and to which the latter is attached at one end at a point removed from the end of the covering strip and wound with it in spiral form, the ends of said covering strip beyond the film being provided with a moisture-proof coating.

2. In a photographic film cartridge, the combination with a spool having flanged ends, of a strip of sensitized, flexible photographic film and a flexible, opaque covering strip therefor wound together upon the spool to form a roll between the flanges, the said covering strip being longer than the film strip and its outer end, extending beyond the latter, being rendered moisture-proof and forming one or more convolutions about the roll.

HARRY LE B. GRAY.

Witnesses:
G. WILLARD RICH,
RUSSELL B. GRIFFITH.